H. W. THOMASSON.
SEEDING MACHINE.
APPLICATION FILED APR. 17, 1919.
1,314,991.
Patented Sept. 2, 1919.
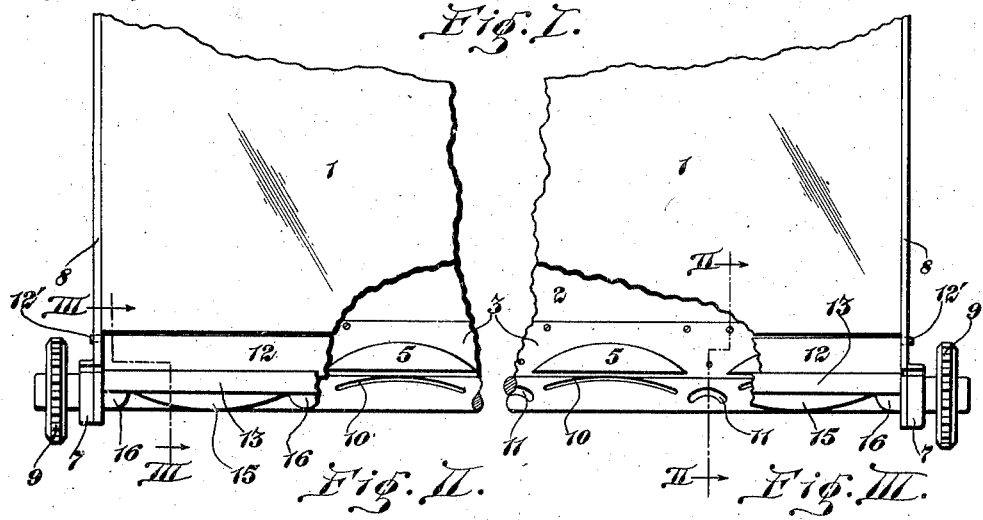
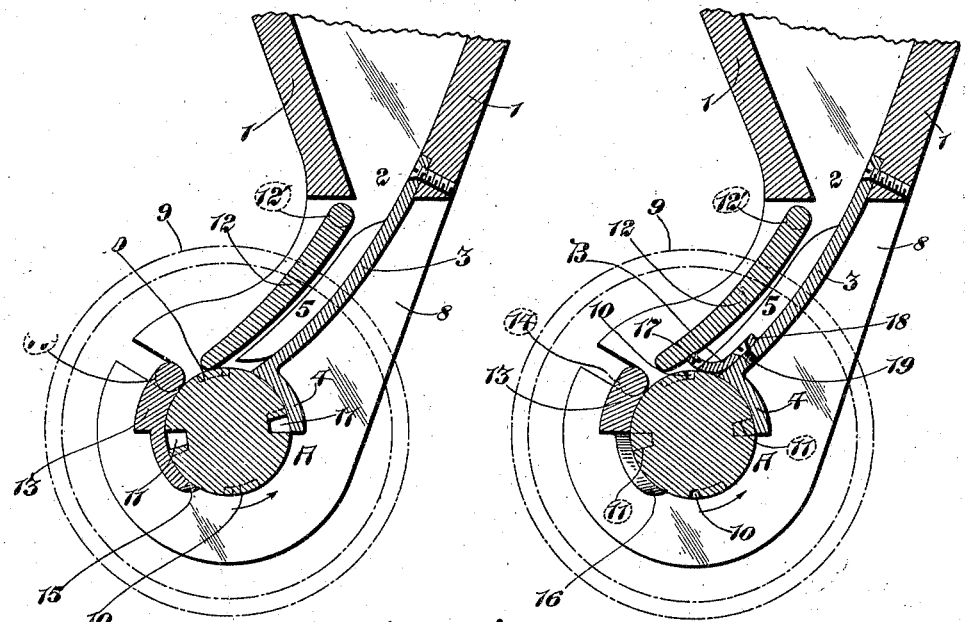
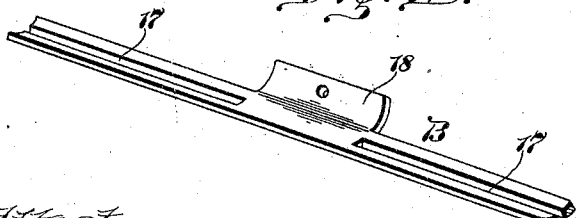
Attest.
Charles A. Becker.
Inventor.
H. W. Thomasson,
by
His Attorneys

UNITED STATES PATENT OFFICE.

HUGH W. THOMASSON, OF ST. LOUIS, MISSOURI.

SEEDING-MACHINE.

1,314,991. Specification of Letters Patent. Patented Sept. 2, 1919.

Application filed April 17, 1919. Serial No. 290,702.

*To all whom it may concern:*

Be it known that I, HUGH W. THOMASSON, a citizen of the United States of America, a resident of the city of St. Louis, in the State of Missouri, have invented certain new and useful Improvements in Seeding-Machines, of which the following is a full, clear, and exact description, reference being had to the accompanying drawings, forming a part of this specification.

My invention relates to a seeding machine so constructed as to permit the sowing of either small or large seeds, and in the use of which the seeds may be scattered uniformly to the ground traversed by the seeding machine, the present machine having structural features therein by which provision is made for the discharge of small seeds through certain paths and the discharge of larger seeds through other paths in the seed feeding and distributing members of the machine.

Figure I is a rear elevation of my seeding machine, the central portion being broken out.

Fig. II is an enlarged vertical section taken on line II—II, Fig. I, with the wiper plate shown in the position assumed when planting large seeds.

Fig. III is a view similar to Fig. II, with the small seed regulating device shown in operative position.

Fig. IV is a perspective view of a fragment of the small seed regulating device.

In the drawings, 1 designates a seed hopper or holder designed to be supported by ground wheels in the manner usual in ordinary seeding machines. Beneath the discharge throat 2 of said hopper is a runway plate 3 terminating at its bottom in a curved member 4 adapted to contact with a rotatable feeding cylinder to be hereinafter described. The runway plate 3 is provided at its side traversed by seeds delivered from the hopper 1 with protuberances or baffles 5 spaced from each other, thereby leaving spaces between said baffles through which seeds may pass, as will be hereinafter explained. Said baffles preferably have curved upper faces as seen in Fig. I.

A designates a seed feeding cylinder resting in contact with the curved member 4 of the runway plate 3 and supported in any suitable manner, as, for example, by journaling the spindles of the cylinder in bearings 7 carried by end plates 8 secured to the hopper 1. The cylinder A may be rotated in any suitable manner, for instance, by sprocket chains fitted to sprocket wheels 9 carried by the cylinder which are adapted to receive sprocket chains driven from the ground wheels of the seeding machine. The cylinder A is located in immediate proximity to the lower end of the runway plate 3, and it is provided at intervals with narrow pockets 10 extending longitudinally of the cylinder and with larger pockets 11 located between the pockets 10, the pockets 10 being opposite the baffles 5 on the runway plate and the pockets 11 being opposite the spaces between said baffles, as seen in Fig. I. The pockets 10 and 11 are preferably of arcuate shape, with an object in view hereinafter made plain.

12 designates a control plate arranged approximately parallel with the runway plate 3, this control plate being pivotally connected at its upper portion to the end plates 8 at 12', so that the control plate hangs suspended back of the runway plate and is adapted to partake of a rise and fall motion relative to the feed cylinder A and the runway plate 3.

13 designates a curved seed distributing plate pivotally mounted at 14 in the end plates 8, said plate being arranged in contact with the feeding cylinder A to provide for the escape of the seed past the lower edge of the plate when it is discharged from said cylinder as the cylinder rotates in the direction indicated by the arrows, Figs. II and III. This seed distributing plate is provided at its lower edge with curved portions 15 corresponding in contour and extent approximately to the contour and extent of the pockets 10 in the feeding cylinder, and also with curved portions 16 corresponding approximately in contour and extent to the contour and extent of the seed pockets 11.

B designates a small seed regulating device in the form of a narrow plate, said device being adapted to be positioned between the runway plate 3 and the control plate 12, and extending longitudinally of the feeding cylinder A beneath the baffles 5. The regulating device comprises slotted portions 17 and ears 18, the latter being adapted to be secured by screws 19 or other suitable means of fastening (see Fig. III) to the runway plate 3 at the spaces between the baffles 5 on said runway plate. The slotted portions 17 of the regulating device B are so located as to be in the paths of rotation of the narrow pockets 10 in the feeding cylinder A, so that small seeds descending through the runway leading from the seed hopper 1 may pass through said slotted portions into said pockets 10. Between the slotted portions of the feed regulating device and opposite the ears 18 are unapertured portions of said regulating device which prevent seed from entering the larger pockets 11 in the feeding cylinder.

When my seeding machine is used for sowing large seeds the small seed regulating device B is omitted from the machine, and the seed feeding and distributing members are used as illustrated in Figs. I and II. Then, in the seeding operation the large seeds descend from the said hopper and pass between the runway plate 3 and the control plate 12, moving through the spaces to the feeding cylinder A, the rotation of which results in the larger pockets 11 in said cylinder being brought consecutively opposite the spaces between the baffles 5. The seed therefore enters said pockets 11 and excess delivery of seed is retarded by the control plate 12. During the rotation of the feeding cylinder, the seed is carried in the pockets 11 until the pockets reach the curved portions 16 of the seed distributing plate 13, past which the seed is thrown to the ground, the curvature of such portions 16 serving to scatter the seeds and distribute them more evenly than would be the case if the portions 16 were straight. When it is desired to use my machine for sowing small seeds, the small seed regulating device B is attached to the runway plate so that its slotted portions 17 extend along the baffles 5, while the unslotted portions of said device serve to block the passage of seed to the larger pockets 11. Upon rotation of the feeding cylinder A during operation of the machine, the small seeds descending from the seed hopper pass through the slotted portions of the feed regulating device and enter the small pockets 10, and are discharged from said pockets past the curved portions 15 of the seed distributing plate 13, being well scattered on emerging from the pockets.

I claim:

1. In a seeding machine, a seed holder having a discharge runway beneath it, a feed cylinder beneath said runway having large and small pockets therein, said runway having baffles spaced from each other to permit the descent of larger seeds between them to the larger pockets in said cylinder, and a feed regulating device detachable from said runway through which small seeds are delivered to the smaller pockets in said cylinder.

2. In a seeding machine, a seed holder, a discharge runway beneath said seed holder having spaced baffles, a feeding cylinder beneath said runway having large seed-receiving pockets opposite the spaces between said baffles and smaller seed-receiving pockets opposite the baffles, and a slotted feed regulating device detachable from said runway and overlying said feeding cylinder, the slots in said regulating device permitting the delivery of small seed to the smaller pockets in said cylinder.

3. In a seeding machine, a seed holder having a discharge runway beneath it provided with spaced baffles, a feeding cylinder beneath said runway having curved pockets therein opposite the spaces between said baffles adapted to receive larger seeds and curved pockets opposite said baffles adapted to receive smaller seeds, and means detachable from said runway for regulating the delivery of seeds to said smaller pockets.

4. In a seeding machine, a seed holder having a discharge runway beneath it provided with spaced baffles, a feeding cylinder beneath said runway having curved pockets therein opposite the spaces between said baffles adapted to receive larger seeds and curved pockets opposite said baffles adapted to receive smaller seeds, means detachable from said runway for regulating the delivery of seeds to said smaller pockets, and a distributing member opposing said feeding cylinder having curved portions corresponding to said curved pockets and past which the seeds are discharged during the rotation of said feeding cylinder.

In testimony that I claim the foregoing I hereunto affix my signature.

HUGH W. THOMASSON.

Copies of this patent may be obtained for five cents each, by addressing the "Commissioner of Patents, Washington, D. C."